Feb. 9, 1971 T. L. BRAGG, JR 3,562,798

CONNECTOR APPARATUS

Filed Jan. 29, 1969

INVENTOR.
THOMAS L. BRAGG, JR.
BY Robert E. Haliath
ATTORNEY

United States Patent Office 3,562,798

Patented Feb. 9, 1971

3,562,798
CONNECTOR APPARATUS

Thomas L. Bragg, Jr., Palm Harbor, Fla., assignor to Honeywell Inc., Minneapolis, Minn., a corporation of Delaware Filed Jan. 29, 1969, Ser. No. 795,015
Int. Cl. H05k *1/12*
U.S. Cl. 339—17 3 Claims

ABSTRACT OF THE DISCLOSURE

A connector for connecting flat cables to printed circuit boards is shown. The insulation at the end of the cable is removed and the cable is clamped to a base which carries matching conductors thereon whereby connections are made directly between the conductors on the base and the conductors in the cable.

BACKGROUND OF THE INVENTION

In the prior art there are various types of connectors in general use. One of the more common types of connector uses male and female plugs. When this type of connector is used, for example, to make connections between external circuitry and a printed circuit board, one of the plugs is mounted on the circuit board and connections are made from the printed circuitry thereto while the other plug is atached to a set of conductors or a cable.

This arrangement has many disadvantages. One of the more important disadvantages is that it is bulky. A second disadvantage is that the conductors on the printed circuit board can be printed much closer together than the contacts in the connectors can be placed. Thus, the conductors on the printed circuit board must be spread to make connections to the plugs thereby requiring a larger area for the connector. A third disadvantage is that there is an impedance mismatch at the connection between the conductors on the printed circuit board and the plug or connector and also between the connector and the cable. At low frequencies this impedance mismatch may not be too significant. However, at the very high frequencies ordinarily encountered in modern devices and systems, impedance mismatch does become significant. The impedance mismatch is increased due to the ftct that the conductors on the printed circuit board must be spread to connect them to the connector plug.

There have been some attempts to overcome these disadvantages. An example of one such attempt is the structure disclosed in U.S. Pat. R. W. McCullough 3,319,216. The disadvantage of this arrangement is that it is bulky and complex to assemble and does not alleviate all of the disadvantages of the prior art.

SUMMARY OF THE INVENTION

This invention provides very simple structure which overcomes the disadvantages of the prior art connectors noted above. A cable which is preferably flat has the insulation removed at one end. Connectors are printed on a base or circuit board in a parallel array spaced the same distance apart as the conductors in the cable. The cable is placed over these conductors and a clamp is placed over the cable to hold it against the circuit board. Alignment pins are provided which assure the alignment of the conductors in the cable with the conductors printed on the circuit board. To assure a good connection, the conductors in the cable may be corrugated in the contact area to provide a type of wiping action.

This invention has the advantages of reducing impedance mismatch and reducing the physical size of the connector. Further, it enables closer spacing of the conductors on the circuit board. While this invention will be described with reference to the connection of a cable to a printed circuit board, it should be realized that the invention may be useable in making connections to devices other than printed circuit boards.

Accordingly, it is an object of this invention to provide new and novel connector apparatus.

This object and other objects and advantages of this invention will become evident to those skilled in the art upon a reading of this specification and the appended claims in conjunction with the drawings, of which:

DETAILED DESCRIPTION OF THE INVENTION

Figure 1:
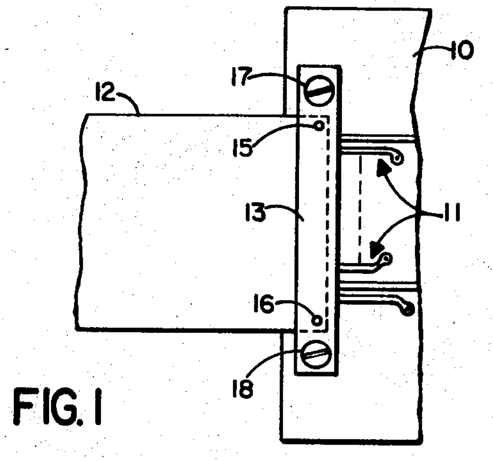
FIG. 1 is a top view of one embodiment of the connector assembly.
Figure 2:
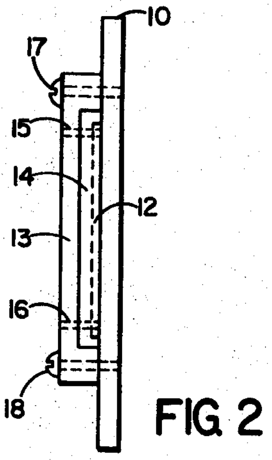
FIG. 2 is a side view of the structure shown in FIG. 1.

In FIGS. 1 and 2 there is shown a first embodiment of the invention. A base means or circuit board 10 has a set of conductors 11 placed or printed thereon. Conductors 11 are not shown in FIG. 2 and circuit board 10 is cut away so that only the area where a connection is to be made is shown. Not all of conductors 11 are shown since the number of conductors will vary depending upon the specific application of this invention. Conductors 11 are printed or placed such that a portion of the conductors are parallel to each other so that a connection can be made to the parallel portions. A cable or conductor means 12 is also shown. The object of the invention is to connect the conductors in cable 12 to conductors 11.

Figures 3, 4:
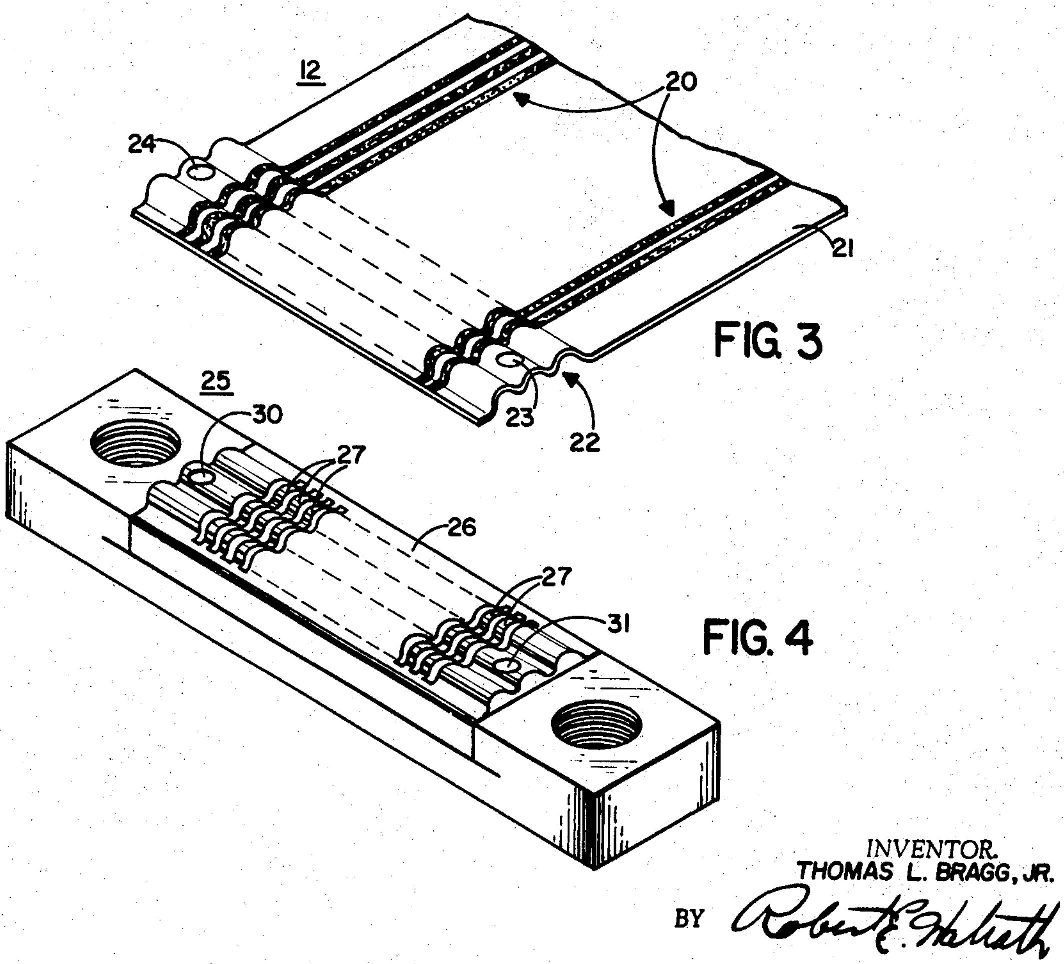
FIG. 3 is an isometric view of a flat cable.
FIG. 4 is an isometric view of a second embodiment of the connector clamp.

Cable 12 is shown in more detail in FIG. 3. While cable 12 is shown as a flat cable, it is only necessary that the cable be flat near the end thereof for making a connection to conductors 11. Cable 12 generally consists of a parallel set of conductors insulated from each other. The insulation is removed or stripped away in the area where a connection is to be made to conductors 11. A clamping means or clamping bar means 13 is placed over cable 12. An insulating or elastic means 14 is placed between clamp 13 and cable 12. Elastic means 14 is preferably a resilient means or material such as an elastic material or rubber which is compressible and will provide tension to hold cable 12 firmly against conductor 11. Alignment pins 15 and 16 are provided to align cable 12 and clamp 13 with circuit board 10. Alignment pins 15 and 16 may be firmly attached to circuit board 10 and cable 12 and clamp 13 may be inserted over the pins; or the alignment pins may be attached to clamp 13 and inserted through holes in cable 12 and circuit board 10. The purpose of alignment pins 15 and 16 is to assure that the conductors in cable 12 are properly aligned wtih conductors 11. Fastening means such as screws 17 and 18 are used to hold clamp 13 firmly to circuit board 10.

Cable 12 is shown in more detail in FIG. 3. Flat cables of the type illustrated are generally a set of printed conductors encapsulated in an insulating material such as a plastic or polyimide material. A suitable procedure for fabricating such a cable is to print or laminate a sheet of copper on a sheet of plastic material such as Kapton and etch the copper to form the conductors. Another sheet of similar plastic material is then laminated over the conductors to encapsulate the conductors.

In FIG. 3 cable 12 consists of conductors 20 encapsulated in a plastic material 21. In the preferred embodiment corrugations or grooves 22 are formed near one end of cable 12 in the area where contact is to be made to conductors 11. The corrugated portion 22 provides a type of wiping action which assures a good contact between conductors 11 and 20. Corrugation 22 may be pressed into cable 12 with a die. Since conductors 20 are encapsulated in a plastic, the plastic must be removed from that side of the cable which is placed against circuit board 10 so that conductors 20 are exposed and can physically contact conductors 11. Note also that is FIG. 3 there are holes 23 and 24 in cable 12. Holes 23 and 24 receive alignment pins 15 and 16.

In FIG. 4 a second clamp design is shown. Clamp 25 is similar to clamp 13 except that the elastic or robber material 14 is not used. Material is replaced by a spring assembly 26 which is attached to clamp 25. Spring assembly 26 consists of a sheet of spring material which has grooves cut out to form individual springs 27. Springs 27 press down on the conductors in cable 12 and firmly press them against conductors 11. Spring assembly 26 has alignment holes 30 and 31 to receive alignment pins 15 and 16. It is preferred that clamp 25 be constructed such that spring assembly 26 can slide sideways at least a short distance so that alignment can be made between spring assembly 26 and cable 12.

In operation clamp 25 merely replaces clamp 13 of FIG. 1 and performs the same function. In FIG. 4 spring assembly 26 is shown with corrugations similar to the corrugated area 22 of cable 12. It is not strictly necessary that spring assembly 26 be corrugated the same as cable 12 or that it be corrugated at all, but corrugations aid the spring action and are preferred. Spring assembly 26 may be constructed of metal or any other material which provides an appropriate spring action. Note that no insulator is required between spring assembly 26 and cable 22 since the upper side of cable 22 is coated with an insulating material and accordingly insulates conductors 20 from spring assembly 26.

Clamps 13 and 25 may be constructed of any suitable metallic material or may be constructed of a suitable plastic material. In some cases a material other than metal may reduce unwanted impedance mismatch.

While I have shown and described various embodiments of my invention, those skilled in the art will realize that many variations and modifications can be made to produce a device different from the exact devices shown in the specification and still be within the spirit and scope of my claimed invention.

I claim as my invention:

1. Connector apparatus comprising, in combination:

circuit means have base means and a first set of conductor means printed on said base means with at least a portion of each of said conductor means being positioned substantially parallel to a portion of each other conductor means in said first set and in proximity thereto;

cable means comprising a second set of conductor means enclosed in an insulating means with a portion of said insulating means being stripped from said cable means at one end thereof and the stripped end being corrugated in the plane of the conductor means; and clamp means positioned over said cable means for holding said cable means against said base means to press the conductor means of said second set against the conductor means in said first set for making connections between pairs of conductor means in said first and second sets.

2. Connector apparatus comprising, in combination:

means including base means and first conductor means, said first conductor means including a first set of conductors positioned on said base means and having a portion of each conductor substantially parallel to a portion of each other conductor of said first set of conductors;

second conductor means including a second set of conductors and means for insulating said second set of conductors, each conductor of said second set of conductors having a portion for connection with a corresponding conductor of said first set of conductors;

clamping means including a layer of corrugated spring with the portion that contacts the second conductor means cut into strips and a clamping bar positioned over said second conductor means with said layer of spring positioned between said clamping bar and said second conductor means;

alignment means coupled to said clamping means, said second conductor means, and said base means for aligning the parallel portions of the conductors of said first conductor means and the conductors of said second set of conductors; and fastening means for fastening said clamping means to said base means.

3. Connector apparatus as defined in claim 2 wherein the portions of the conductors of said second set of conductors which contact the conductors of said first set of conductors are corrugated in the plane of the second set of conductors.

References Cited

UNITED STATES PATENTS

| | | | |
|---|---|---|---|
| 2,967,284 | 1/1961 | Bailey et al. | 339—17 |
| 3,038,140 | 6/1962 | Haberland | 339—17 |
| 3,088,090 | 4/1963 | Cole et al. | 339—17 |
| 3,114,587 | 12/1963 | Herrmann | 339—17X |
| 3,158,421 | 11/1964 | Hasenaver | 339—176 |
| 3,319,216 | 5/1967 | McCullough | 339—17X |
| 3,444,506 | 5/1969 | Wedekind | 339—17X |

DAVID H. BROWN, Primary Examiner

U.S. Cl. X.R.

339—174, 176